(12) United States Patent
Martinez et al.

(10) Patent No.: US 10,637,840 B1
(45) Date of Patent: Apr. 28, 2020

(54) SYSTEM AND METHODS TO SECURE AND DISPLAY INFORMATION TRANSMITTED BETWEEN MULTIPLE PLATFORMS AND MULTIPLE APPLICATIONS USING THE SHORT MESSAGE SERVICE (SMS), FOR REGISTERED USERS

(71) Applicants: Gustavo Andres Martinez, Key Biscayne, FL (US); Luis Forero, Ave Maria, FL (US)

(72) Inventors: Gustavo Andres Martinez, Key Biscayne, FL (US); Luis Forero, Ave Maria, FL (US)

(*) Notice: Subject to any disclaimer, the term of this patent is extended or adjusted under 35 U.S.C. 154(b) by 50 days.

(21) Appl. No.: 16/022,404

(22) Filed: Jun. 28, 2018

Related U.S. Application Data

(63) Continuation-in-part of application No. 15/041,900, filed on Feb. 11, 2016, now abandoned.

(60) Provisional application No. 62/114,579, filed on Feb. 11, 2015.

(51) Int. Cl.
*H04L 29/06* (2006.01)
*H04W 4/14* (2009.01)
*H04L 29/08* (2006.01)
*H04W 12/10* (2009.01)
*H04W 88/16* (2009.01)

(52) U.S. Cl.
CPC .......... *H04L 63/0485* (2013.01); *H04L 67/20* (2013.01); *H04W 4/14* (2013.01); *H04W 12/10* (2013.01); *H04L 69/16* (2013.01); *H04L 2209/80* (2013.01); *H04W 88/16* (2013.01)

(58) Field of Classification Search
CPC . H04L 63/0485; H04L 69/16; H04L 2209/88; H04L 67/20; H04L 2209/80; H04W 4/14; H04W 12/10; H04W 88/16
USPC ........................................................ 713/150
See application file for complete search history.

(56) References Cited

U.S. PATENT DOCUMENTS

| | | | |
|---|---|---|---|
| 2004/0162142 A1* | 8/2004 | Cousineau | G07F 17/3223 463/41 |
| 2008/0292101 A1* | 11/2008 | Macchi | H04L 63/0428 380/270 |
| 2009/0187671 A1* | 7/2009 | Peacock | H04L 67/2823 709/232 |
| 2009/0215477 A1* | 8/2009 | Lee | H04L 51/38 455/466 |
| 2012/0072979 A1* | 3/2012 | Cha | G06F 21/34 726/7 |
| 2013/0056533 A1* | 3/2013 | Zimberoff | G06Q 10/08 235/375 |

(Continued)

*Primary Examiner* — Kambiz Zand
*Assistant Examiner* — Benjamin A Kaplan
(74) *Attorney, Agent, or Firm* — Sanchelima & Associates, P.A.; Christian Sanchelima; Jesus Sanchelima

(57) ABSTRACT

A system using a URN scheme and having a server 50 connected to a global computer network 40, and registered computerized station 20 connected to a cellular network 10, with both networks interconnected through an SMS gateway 30, having an application that resides in each computerized station. The application or the server is capable of encrypting SMS messages to prevent unauthorized third-parties from intercepting sensitive data. The SMS messages travel encrypted until reaching their intended recipient upon which time the application residing in the registered user computer station will decrypt and use the original message.

14 Claims, 3 Drawing Sheets

(56) References Cited

U.S. PATENT DOCUMENTS

2014/0324724 A1\* 10/2014 Zimberoff .............. G06Q 10/08
705/330

\* cited by examiner

SYSTEM AND METHODS TO SECURE AND DISPLAY INFORMATION TRANSMITTED BETWEEN MULTIPLE PLATFORMS AND MULTIPLE APPLICATIONS USING THE SHORT MESSAGE SERVICE (SMS), FOR REGISTERED USERS

OTHER RELATED APPLICATIONS

The present Continuation in Part application is based on U.S. Provisional Patent Application Ser. No. 62/114,579 filed on Feb. 11, 2015 and U.S. Non-Provisional patent application Ser. No. 15/041,900 filed Feb. 11, 2016, that are hereby incorporated by reference.

BACKGROUND OF THE INVENTION

1. Field of the Invention

The present invention relates to a multi-platform, multi-application system to securely transmit and display encrypted information using Short Message Service (SMS).

2. Description of the Related Art

Several systems using short messaging have been implemented in the past. None of them, however, include a means to encrypt sensitive information being transmitted as an SMS and correspondingly decrypt such information that can be used by multiple and selective applications on a remote station, such as a mobile phone, computer, tablet, etc.

Presently, a mobile operating system has a hierarchy for giving priority to different types of notifications and messages received. At the top of this priority among notifications are SMS messages. For instance, banks take advantage of the priority given to SMS messages to send notifications to users with enhanced reliability.

The current problem with SMS messages as they were specified by the GSM standard, is that it does not provide the means to protect the information transmitted. The present invention solves this problem by creating an operating environment in which SMS messages are encrypted and then handed over to selected applications. This allows a user to benefit from the reliability of SMS messages while achieving a level of security not existing within standard SMS messaging systems.

Other documents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a system having a secure means of transmission of information using SMS.

It is another object of this invention to provide such a system that can be used by a plurality of computer devices, operating systems and applications.

It is still another object of the present invention to provide such a system that is easy to use, interactive, and effectively transmits information via SMS without being vulnerable to scanners or sniffers picking up transmitting messages, tapping lines, insiders working with communication servers, or malware running on the device.

It is another object of the present invention to provide a system that uses an application that resides on the users computerized device that decrypts, uses and/or displays the information in a user-friendly graphic format.

It is still another object of the present invention to provide a system that can work with third party applications to secure information sent by theses third parties and send such information using SMS messaging.

It is still another object of the present invention to provide a system that does not require Internet connectivity to transmit information securely. All information is contained within SMS messages.

Further objects of the invention will be brought out in the following part of the specification, wherein detailed description is for the purpose of fully disclosing the invention without placing limitations thereon.

BRIEF DESCRIPTION OF THE DRAWING

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
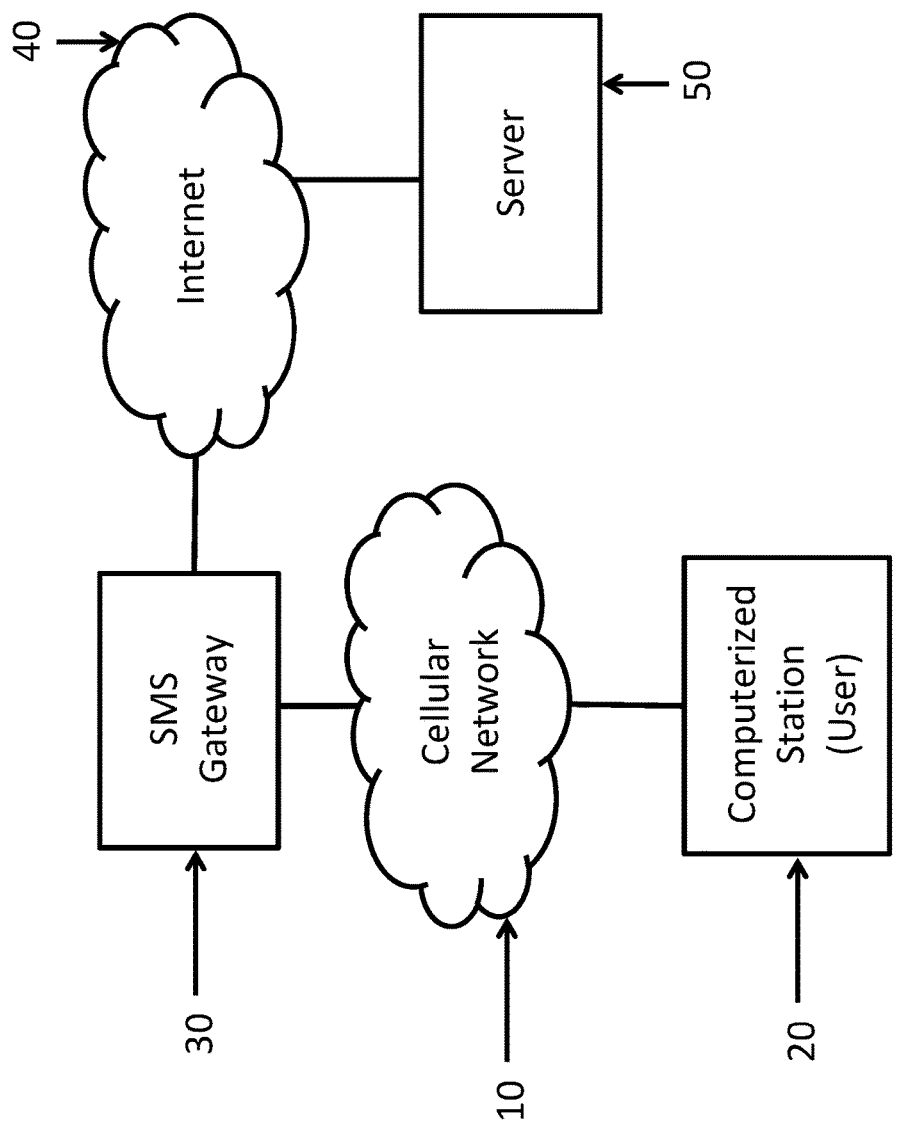
FIG. 1 represents a partial schematic for the operating environment of the present invention showing cellular network 10, server 50, SMS gateway 30 and recipient remote computerized user station 20.

Referring now to FIG. 1, where it can be observed that the present invention basically includes cellular network 10, server 50, SMS gateway 30, and recipient computerized user station 20. As shown in FIG. 1, SMS gateway 30 and recipient computerized user station 20 are connected to cellular network 10. Server 50 and SMS gateway 30 are connected to a global computer network (Internet) 40. Recipient computerized user station 20 can include mobile devices, such as mobile phones, tablets, laptops, etc. SMS gateway 30 and recipient computerized user station 20 can further include computer stations.

Figure 2:
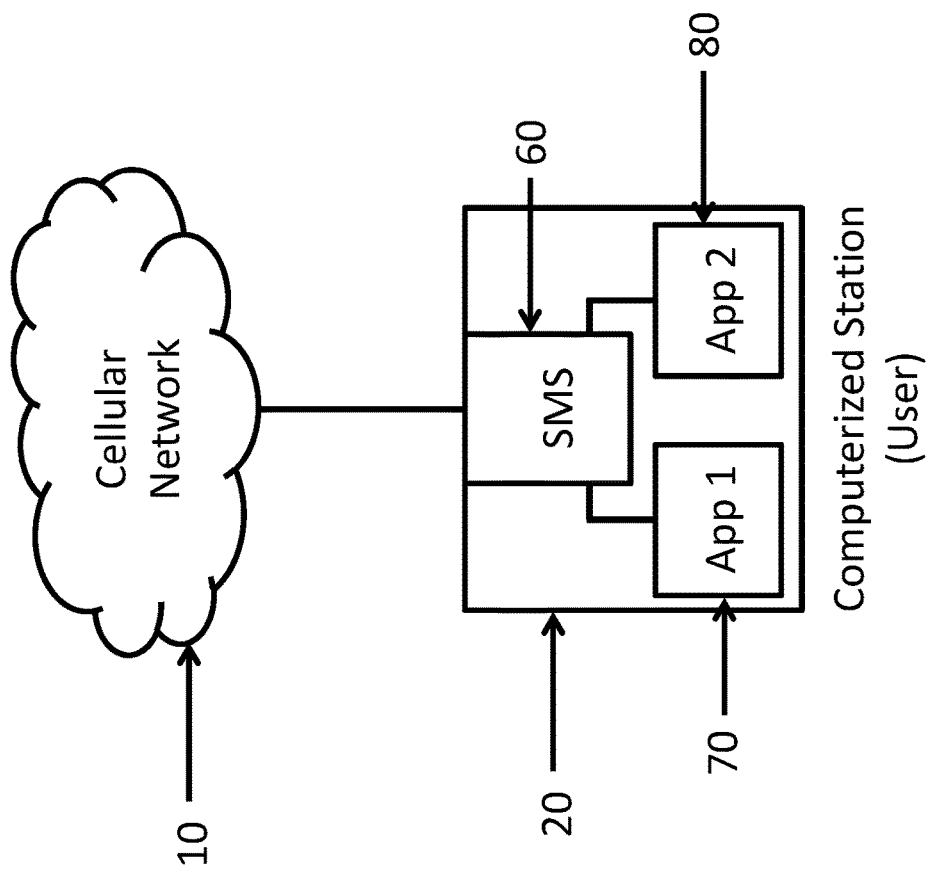
FIG. 2 shows a partial schematic for the operating environment of the present invention wherein the software units of the computerized user station 20 can be seen.

As shown in FIG. 2, recipient computerized user station 20 is also connected to cellular network 10 to be able to receive and transmit SMS messages. Recipient computerized user station 20 similarly includes SMS application 60, system application 70 and optionally third party applications 80.

Figure 3:
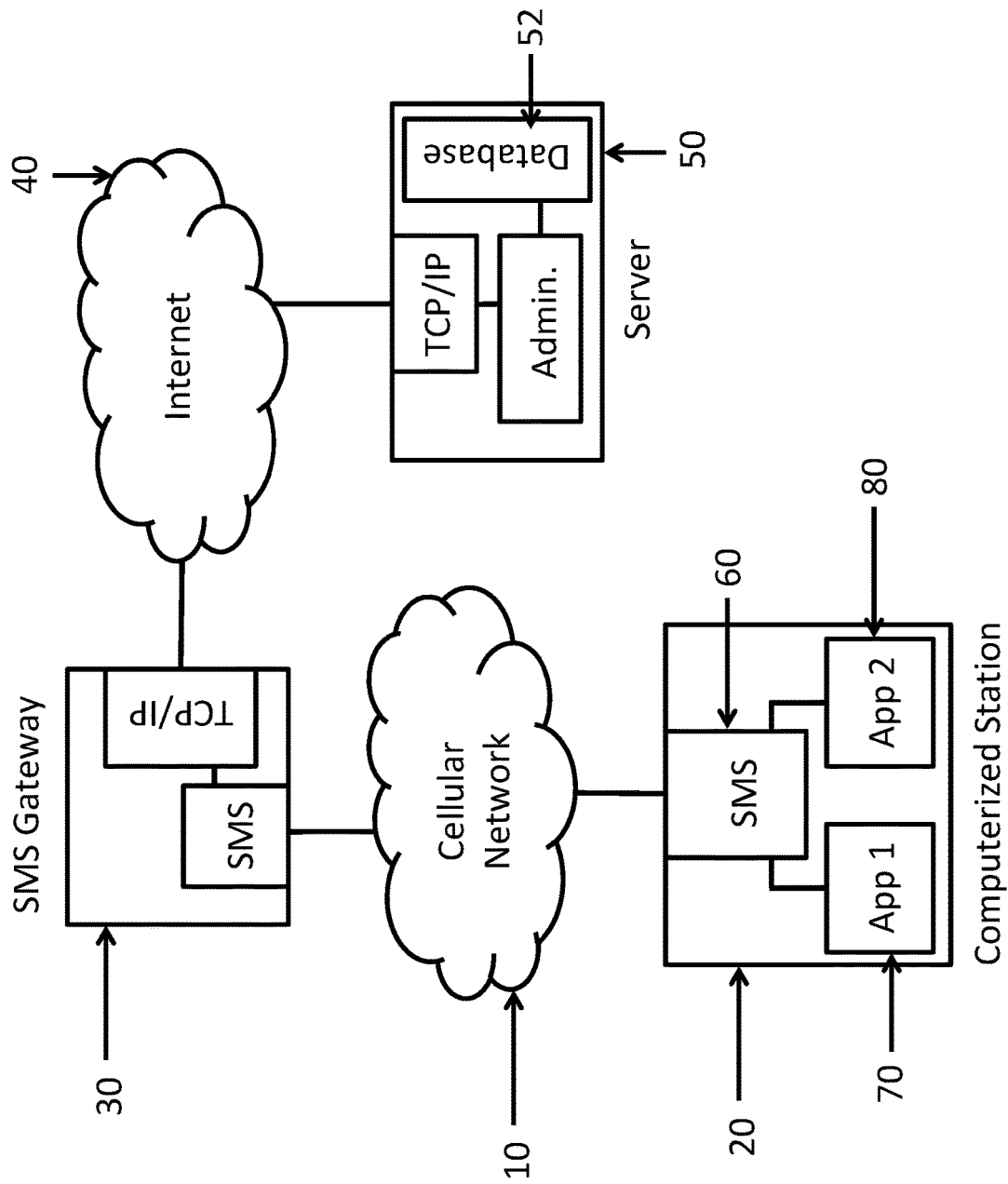
FIG. 3 illustrates the general schematic for the operating environment of the present invention including all the components shown in FIG. 1 with the addition of the software units of some components.

As shown in FIG. 3, computerized station 20 is registered to server 50 through an application 70 in sender computerized station 20 that resides in each computerized station 20. System application 70 on sender computerized station 20 can be a third party application 80 as shown in FIG. 3. System application 70 allows a user to create an SMS message and choose a phone number associated with a predetermined recipient. The message is then encrypted using symmetric and asymmetric methods and sent to SMS application 60 of sender computerized station 20 where it can be securely sent to a predetermined recipient using cellular network 10. In an alternate embodiment, a third party application 80 can be used to generate the SMS message.

As also seen in FIG. 3, server 50 includes at least one programmable database 52, an administration portal, and a TCP/IP configuration. Server 50 is connected to a global computer network 40, such as the Internet. While the secure message is being transmitted it is secured as it travels across cellular network 10. This prevents unauthorized third-parties from intercepting and read the message during transmission.

Upon being received by SMS application 60, the message can remain encrypted until system application 70 is used to decrypt, using symmetrical and asymmetrical methods, and display the original message. Recipient computerized user station 20 uses a URN Scheme to transmit the encrypted message from the SMS application to the appropriate application. The message can be received and decrypted by system application 70 or by a registered third party application 80.

Doing so allows a user at computerized station 20 to benefit from the priority given to its SMS message while creating a secure operating environment for the message being transmitted. The system will have SMS-Share capabilities to edit an SMS message and Plain SMS capabilities to send an SMS message. System will utilize Symmetric and Asymmetric Encryption when encrypting messages and character encoding to ensure that all characters sent are received. Also, the present invention will utilize SMS Concatenation to be able to send messages longer than 160 characters. In a preferred embodiment, the present invention will include a Uniform Resource Name (URN) to invoke and subsequently launch an application and transfer the information between applications residing in computerized station 20. Server 50 will also include programmable databases to centralize user management. In addition, OS Detection is used to ensure that the URN-Scheme received is adequate and works faultless across different platforms.

A user begins using the system subject of the present invention by downloading system application 70; 80 onto recipient computerized user station 20.

System application 70; 80 informs server 50 which operating system application 70; 80 is downloaded on, and the encryption parameters it uses. This is so server 50 can effectively communicate with the user. For instance, server 50 can determine which URN-Scheme to use for the computerized station depending on the operating system that it is running.

This handshake protocol is completed by server 50 sending a confirmation message to the user confirming the operating system and phone number associated with the computerized station. This is optional and can simply be replaced by a message that states that system application 70; 80 is ready for use. Once application 70; 80 is ready for use a user can create and send messages to preselected recipients. When using system application 70 to send messages, these messages are edited within it, then they are encrypted in the phone's memory and transferred to native SMS application 60 using either the sharing capabilities of the operating system or the default URN Scheme for SMS. The encrypted message can be then sent over the standard SMS service using cellular network 10 to native SMS application 60 of recipient computerized station 20. When using server 50 to send messages, it encrypts and sends these messages directly. The encrypted message is then sent over the cellular network to the recipient.

Encrypted messages are received by the recipient's SMS Inbox. These messages are formatted with a URN Scheme that allows the operating system to invoke the appropriate application and transfer the message that can be further decrypted in the phone's memory and displayed. In the event that the recipient does not have an application compatible with the system, the recipient will be notified to download the corresponding application 70; 80. Compatible applications capable of decrypting SMS messages encrypted by the system can comprise of third party applications 80, including those belonging to banks, couriers, medical providers, and other third-party providers represented as a third party application.

In an alternate embodiment, third-party applications 80 can communicate with the server 50 over Internet 40 to send secured messages to one or more users. Server 50 uses its database to determine the recipient(s) of the message. SMS Gateway 30 used to transmit the message through cellular network 10 to SMS applications 60 within computerized stations 20. From there the message can be directed to system application 70 or third party application 80 depending on the URN-Scheme used with the message. It is not required that users have a data plan or a permanent internet connection, for the information to move end to end securely at any time.

However, using the SMS-Invoke-App functionality a reference to the sent secured message (or part of the information) can be used to later download the complete information via a global computer network such as the Internet. The transmission of information sent using this system is not limited to SMS but can include or be replaced or complemented by a data network or Internet. This latter medium can provide increased capacity for larger messages and an added layer of security.

As shown in FIG. 3, Server 50 can be also connected to SMS gateway 30 and to cellular network 10 to be able to send and receive SMS messages. Server 50 can then send and receive SMS addressed directly to system application 70 or to third party system application 80. As also seen in FIG. 3, server 50 includes at least one programmable database 52, an administration portal, and a TCP/IP configuration. Server 50 can be connected to a global computer network 40, such as the Internet. While the secure message is being transmitted it can be secured as it travels across cellular network 10. This prevents unauthorized third-parties from intercepting and read the message during transmission.

Upon being received by SMS application 60, the message can remain encrypted until system application 70 can be used to decrypt, using symmetrical and asymmetrical methods, and display the original message. Recipient computerized user station 20 uses a URN Scheme to transmit the encrypted message from the SMS application to the appropriate application. The message can be received and decrypted by system application 70 or by a registered third party application 80.

Doing so allows a user at computerized station 20 to benefit from the priority given to its SMS message while creating a secure operating environment for the message being transmitted. The system will have SMS-Share capabilities to edit an SMS message and Plain SMS capabilities to send and receive an SMS message. System will utilize Symmetric and Asymmetric Encryption when encrypting messages and Character encoding to ensure that all characters sent are received. Also, the present invention will utilize SMS Concatenation to be able to send messages longer than 160 characters. In a preferred embodiment, the present invention will include a Uniform Resource Name (URN) to invoke and subsequently launch an application and transfer the information between applications residing in computerized stations 20. Server 50 will connect to SMS gateway 30 to communicate with the cellular network, and programmable databases 52 to centralize user management. In addition, OS Detection can be used to ensure that the URN Scheme received can be adequate and works faultless across different platforms.

A user begins using the system subject of the present invention by downloading and installing system application 70; onto sender and recipient computerized user station 20. System application 70 then compose an encrypted registration message, specifying the operative system and sends it through SMS Application 60 to Server 50, then server 50 completes the registration by responding to computerized station 20, through SMS gateway 30 with an encrypted SMS message. This is so server 50 can effectively communicate with the user. For instance, server 50 can determine which URN-Scheme to use for the computerized station depending on the operating system that it is running.

Once application 70 is ready for use, a user can communicate with the server securely using SMS messages. When using system application 70 to send messages, these messages are encrypted in the phone's memory and transferred to native SMS application 60 using either the sharing capabilities of the operating system or the default URN Scheme for SMS. The encrypted message is then sent over the standard SMS service using cellular network 10 to server 50, as shown in FIG. 3.

Encrypted messages sent by server 50 are received by the native SMS application 60 of the computerized station 20. These messages are formatted with a URN Scheme that allows the operating system to invoke the appropriate application and transfer the message that can be further decrypted in the phone's memory and displayed. In the event that the recipient does not have an application compatible with the system, the recipient will be notified to download the corresponding application. Compatible applications capable of decrypting SMS messages encrypted by the system can comprise of third party applications 80, including those belonging to banks, couriers, medical providers, and other third party providers represented as third party application 80.

Using the SMS-Invoke-App functionality a reference to the sent secured message can be used (or part of the information) can be used to later download the complete information via a global computer network such as the Internet. The transmission of information sent using this system is not limited to SMS but can include or be replaced or complemented by a data network or Internet. This latter medium can provide increased capacity for larger messages and an added layer of security.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An SMS message encryption and decryption system, comprising:
A) a cellular network; an SMS gateway; a global computer network; a remote computerized user station; a server; wherein said remote computerized user station is connected to said cellular network; said server is connected to said global computer network; said server includes at least one programmable database, an administration portal, a TCP/IP configuration, wherein said server is connected to said SMS gateway through said global computer network; a system application residing in said remote computerized user station and the server; said system application encrypts SMS messages using symmetrical or asymmetrical methods; said encrypted SMS messages are sent to an SMS application residing on said remote computerized station; said encrypted SMS messages sent using standard SMS messaging service on said cellular network; said encrypted SMS message sent to the server through said SMS gateway; said encrypted message is decrypted by said server using the same symmetrical or asymmetrical methods, a response from said server being a URN (Unique Resource Name) scheme; said response is encrypted and then sent to said remote computerized user station through said global computerized network to said SMS Gateway then to said remote computerized station through said cellular network as a standard SMS message; said message is first delivered to a native SMS application and through said URN scheme said message is transferred to an appropriate system application, by invoking and launching said system application, said encrypted message is then decrypted and adapted to be used for processing or display, wherein said URN scheme transfers said message to a remote computerized user station's appropriate system application, said URN scheme invokes and launches said remote computerized users station's appropriate system application.

2. The system set forth in claim 1 wherein said sender or recipient computerized stations are mobile devices.

3. The system set forth in claim 2 wherein said mobile devices include tablets, laptops, computer stations or servers.

4. The system set forth in claim 3 wherein said mobile devices each contain at least one system application, said URN Scheme determines which system application to direct the SMS messages to.

5. The system set forth in claim 4 wherein said system application the SMS message is directed to is a third party application.

6. The system set forth in claim 4 wherein the system application the SMS message is sent from is a third party application.

7. The system set forth in claim 1 wherein said system includes OS detection to ensure that said URN scheme received is adequate and works faultless across different platforms.

8. A system, comprising: a cellular network, a server, a sender computerized station, a recipient, and a recipient computerized station wherein said sender and recipient computerized stations are connected to said cellular network, an SMS message having content, said sender computerized station including a first system application and a first SMS application, said recipient computerized station including a second system application and a second SMS application, said first system application used to generate and encrypt SMS messages using symmetrical or asymmetrical methods, said encrypted SMS message includes a URN scheme, said SMS message sent from said first SMS application to said second SMS application, said URN scheme identified by said recipient computerized station's operating system and said content is sent to an appropriate second system application, said appropriate second system application decrypts said content, thereby converting said encrypted SMS message into a decrypted SMS message, and displays said content to said recipient, wherein said URN scheme transfers said decrypted SMS message to said appropriate second system application, said URN scheme invokes and launches said appropriate second system application.

9. The system set forth in claim 8 wherein said sender or recipient computerized stations are mobile devices.

10. The system set forth in claim 9 wherein said mobile devices include tablets, laptops, computer stations or servers.

11. The system set forth in claim 10 wherein said mobile devices each contain at least one system application, said URN Scheme determines which system application to direct the SMS messages to.

12. The system set forth in claim 11 wherein said at least one system application the SMS message is sent to is a third-party device or a third-party application.

13. The system set forth in claim 11 wherein said at least one system application the SMS message is sent from is included in a third-party device or a third-party application.

14. The system set forth in claim 8 wherein said system includes OS detection to ensure that said URN scheme received is adequate and works faultless across different platforms.

\* \* \* \* \*